June 20, 1961   G. BOULET   2,989,153
DISC BRAKES
Filed Oct. 22, 1957
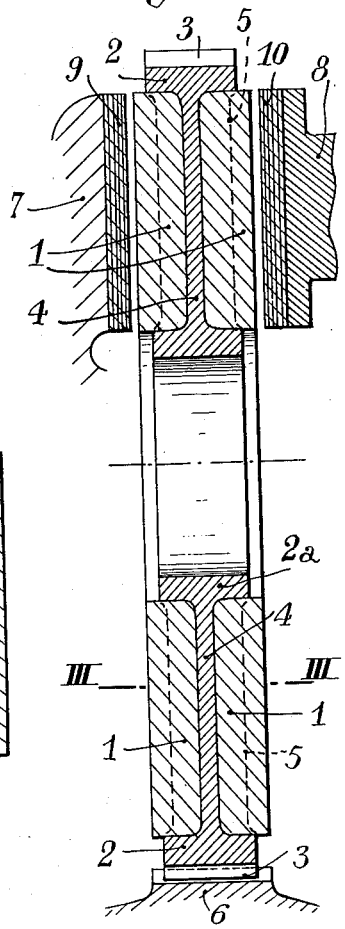
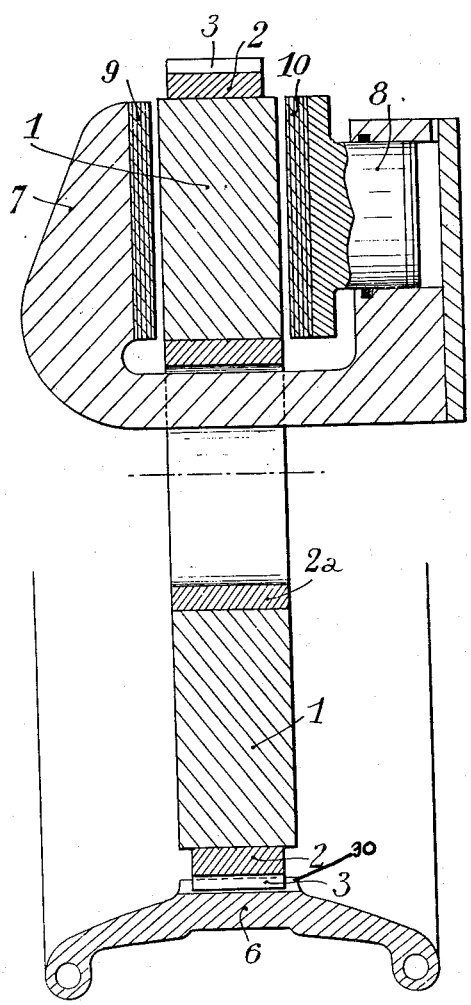
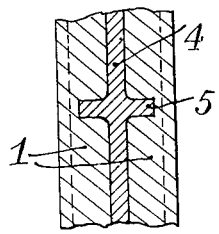

United States Patent Office 2,989,153
Patented June 20, 1961

2,989,153
DISC BRAKES
Georges Boulet, Toulouse, France, assignor to Recherches Etudes Production R.E.P., Paris, France, a corporation of France, a limited society
Filed Oct. 22, 1957, Ser. No. 691,767
Claims priority, application France Oct. 25, 1956
10 Claims. (Cl. 188—218)

This invention relates to improvements in or relating to disc brakes.

Hitherto discs used in brakes of the type known as disc brakes were made of iron or copper.

Tests have now shown the surprising fact that a disc of beryllium presents from the calorific point of view during braking action a behavior comparable to that of the conventional discs of iron or copper of substantially equal size, while at the same time having the advantage over these of being much lighter since its specific weight varies over a range of substantially 1.81 to 1.89 depending upon the treatment when produced.

The combination of the property of lightness with this unexpected aptitude of adapting itself to conditions of intense heat exchange caused by braking, which are especially notable on aircraft of great weight, makes a brake disc of beryllium technically superior to its predecessors as shown by the following figures:

For the same temperature of the disc at the end of braking, a brake disc of beryllium provides a saving in weight of 78% in comparison with copper discs and of 74% in comparison with iron discs.

In order to avoid in certain cases the possible risks of rupture resulting from the relative fragility of beryllium the disc can be provided with a mechanical envelope assuring effective transmission of the braking torque through slots usually provided in the discs.

Embodiments of the invention are illustrated by way of example in the accompanying drawing wherein:

FIGURE 1 is an axial section of one construction,
FIGURE 2 is a similar section of a second construction, and
FIGURE 3 is a transverse section taken on lines III—III of FIGURE 2.

In FIGURE 1, 1 indicates a brake disc of beryllium; 2, a band of steel enveloping the disc 1. Notches 3 in the envelope 2 co-operate with keys, bolts 30 or the like usually provided on the revolving part of the wheel 6 or on the fixed part of the brake to prevent relative rotation. For the same purpose the internal surface of the disc 1 may have a ring or support of steel 2a. The rings 2 and 2a are attached to the disc by any suitable means to assure the transmission of shearing torque.

A brake support 7 is provided with a stationary face for carrying friction lining 9 which engages one face of disc 1 and with a movable face defined by piston 8 for carrying another friction lining 10 for engagement with the other face of disc 1.

Referring to FIGURES 2 and 3 in which similar reference characters designate similar parts, a support 4 in steel affords two annular recesses, one in each face, subdivided by radial ribs 5 and surrounded by an enveloping metal rim. Beryllium 1 is poured into, or fused in, the recesses. The ribs 5 assure resistance to torque resulting from the forces of friction. As before, slots 3 are cut on the circumference of the envelope 2 for driving the disc.

It is within the scope of the invention for the friction surfaces of the beryllium disc to receive treatment such as nitration, oxidation or otherwise, which is capable of increasing resistance to wear, or of absorbing heat by transformation of oxides.

I claim:
1. A brake structure comprising an outer envelope having the shape of a ring and an inner annular disc portion of beryllium within said envelope, said outer envelope confining said disc solely on the peripheral edge thereof and having a higher mechanical strength than said beryllium, said beryllium disc being homogeneous throughout and being firmly secured to said outer envelope.

2. The brake structure as claimed in claim 1, wherein said outer envelope is also provided with an extension which passes through the disc from the periphery of said inner disc toward the interior thereof to afford additional support to said beryllium.

3. The brake structure of claim 1 wherein the beryllium has friction surfaces of nitrated beryllium in order to increase resistance to wear and assist in heat exchange.

4. The brake structure as claimed in claim 1 comprising a support coupled to the inner portion of said outer envelope, said beryllium extending between said outer envelope and said support.

5. The brake structure of claim 4 in which said outer envelope and said support provide two cup-shaped structures, said beryllium being positioned within each said cup-shaped structure, said extension constituting a rib projecting from each side of said support to assure resistance to torque resulting from frictional forces.

6. A braking mechanism for a vehicle wheel comprising means having opposed braking surfaces, and a braking device having friction surfaces for engaging the braking surfaces, said means being a disc of homogeneous beryllium metal.

7. A braking mechanism as claimed in claim 6 comprising an outer envelope of steel surrounding said disc to provide rigidity and strength for the same, and an inner envelope of steel concentric with said outer envelope, said beryllium metal being disposed between said outer and inner envelopes.

8. A braking mechanism as claimed in claim 7 comprising coupling element on said outer element and a coupling element on said wheel, the coupling elements being engaged so that said wheel and beryllium metal rotate together for transmission of braking torque to said wheel.

9. A frictional coupling device comprising an outer steel envelope, an inner steel envelope, said inner steel envelope being disposed concentrically within said outer steel envelope, and a homogeneous beryllium disc element coupled to and disposed between said outer and inner envelopes.

10. The coupling device of claim 9 including a central steel disc member disposed between said outer and inner envelopes, the first said homogeneous beryllium disc element being disposed between said outer and inner envelopes on one side of said disc member and a second homogeneous beryllium disc element disposed on said other side of said disc member between said outer and inner envelopes, said steel members imparting rigidity to said coupling device and said beryllium reducing the weight of said device while providing for the same frictional torque produced by a wholly steel coupling device of the same dimensions.

References Cited in the file of this patent
UNITED STATES PATENTS

| | | |
|---|---|---|
| 2,359,361 | Gleszner et al. | Oct. 3, 1944 |
| 2,519,865 | Wellman | Aug. 22, 1950 |
| 2,525,648 | Butler | Oct. 10, 1950 |
| 2,549,596 | Hamilton et al. | Apr. 17, 1951 |
| 2,697,499 | Butler | Dec. 21, 1954 |
| 2,708,492 | Helsten | May 17, 1955 |
| 2,719,438 | Schiefer | Oct. 4, 1955 |

(Other references on following page)

UNITED STATES PATENTS 2,725,288    Dodds et al. _____ Nov. 29, 1955
2,753,959    Johnson _____ July 10, 1956

OTHER REFERENCES

Metals and Alloys, vol. 1, No. 2, August 1929, page 72, col. 2, lines 17–19.

Beryllium and Some of Its Al Alloys, reprinted from Metals and Alloys, June 1940.

Mechanical Properties of Beryllium Fabricated by Powder Metallurgy, reprinted from Journal of Metals, May 1954.

D. W. White, Jr., The Metal Beryllium, published 1955, pages 269, 270 and 271 relied on.